(12) United States Patent
Spink

(10) Patent No.: US 7,924,708 B2
(45) Date of Patent: Apr. 12, 2011

(54) METHOD AND APPARATUS FOR FLOW CONTROL INITIALIZATION

(75) Inventor: Aaron T. Spink, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 11/301,935

(22) Filed: Dec. 13, 2005

(65) Prior Publication Data

US 2007/0133415 A1 Jun. 14, 2007

(51) Int. Cl.
*H04J 1/16* (2006.01)

(52) U.S. Cl. .................................. 370/229; 370/412

(58) Field of Classification Search .......... 370/229–236, 370/252, 253, 395, 395.1, 400, 401, 413, 370/414, 389, 412; 709/222, 223, 230–236
See application file for complete search history.

(56) References Cited

U.S. PATENT DOCUMENTS

| | | | |
|---|---|---|---|
| 5,719,800 A | 2/1998 | Mittal et al. | |
| 5,734,825 A * | 3/1998 | Lauck et al. ................ | 709/233 |
| 6,009,488 A | 12/1999 | Kavipurapu | |
| 6,044,406 A * | 3/2000 | Barkey et al. ................ | 709/235 |
| 6,618,354 B1 * | 9/2003 | Sharma ........................ | 370/229 |
| 6,826,704 B1 | 11/2004 | Pickett | |
| 6,901,524 B2 | 5/2005 | Watts, Jr. | |
| 6,931,559 B2 | 8/2005 | Burns et al. | |
| 7,085,846 B2 * | 8/2006 | Jenne et al. ................. | 709/232 |
| 7,114,086 B2 | 9/2006 | Mizuyabu et al. | |
| 7,194,643 B2 | 3/2007 | Gonzalez et al. | |
| 7,237,131 B2 | 6/2007 | Kwa et al. | |
| 7,353,414 B2 | 4/2008 | Chrysos | |
| 7,689,844 B2 | 3/2010 | Chrysos | |
| 2004/0054857 A1 | 3/2004 | Nowshadi | |
| 2004/0226016 A1 | 11/2004 | Sreejith | |
| 2006/0206740 A1 | 9/2006 | Hurd | |
| 2006/0206898 A1 | 9/2006 | Miner et al. | |
| 2006/0230256 A1 | 10/2006 | Chrysos | |
| 2006/0282622 A1 | 12/2006 | Sistla et al. | |
| 2008/0109634 A1 | 5/2008 | Chrysos | |

OTHER PUBLICATIONS

Anderson, Don et al. "HyperTransport Flow Control." Addison Wesley Professional, Jun. 6, 2003, pp. 1-8. http:www.awprofessional.com/articles/article.asp?p=31944&segNum=5.
Cleveland, Sean et al. "HyperTransport Technology: Simplifying System Design." White Paper AMD, Jul. 2002, pp. 1-22, Advanced Micro Devices, Inc. One AMD Place, Sunnyvale CA 94088.
"Advanced Configuration and Power Interface Specification." Compaq Computer Corporation, Intel Corporation, Microsoft Corporation, Phoenix Technologies Ltd., Toshiba Corporation, Jul. 27, 2000, Revision 2.0, 1-482.
"PCI Express Base Specification Revision 1.0a." PCI Express, Apr. 15, 2003, 1-428.

* cited by examiner

*Primary Examiner* — Huy D Vu
*Assistant Examiner* — Dady Chery
(74) *Attorney, Agent, or Firm* — Blakely, Sokoloff, Taylor & Zafman LLP

(57) ABSTRACT

According to one embodiment of the invention, a credit/debit flow control mechanism performs credit initialization by a combination of standard protocol level messages (e.g., one or more flits) with encoded credit return values and the use of saturating counters.

14 Claims, 8 Drawing Sheets

| Credit Return Code | Credit Operation |
|---|---|
| 0b000 | NOP/Null |
| 0b001 | 2 VNA |
| 0b010 | 8 VNA |
| 0b011 | 16 VNA |
| 0b100 | Next Flit (A) |
| 0b101 | Next Flit (B) |
| 0b110 | Reserved |
| 0b111 | Reserved |

*FIG. 6A*

| Credit Return Code | Credit Operation (A) |
|---|---|
| 0b000 | VN0 - VC0 |
| 0b001 | Reserved |
| 0b010 | VN0 - VC1 |
| 0b011 | VN0 - VC2 |
| 0b100 | VN0 - VC3 |
| 0b101 | VN0 - VC4 |
| 0b110 | VN0 - VC5 |
| 0b111 | Reserved |

*FIG. 6B*

| Credit Return Code | Credit Operation (B) |
|---|---|
| 0b000 | VN1 - VC0 |
| 0b001 | Reserved |
| 0b010 | VN1 - VC1 |
| 0b011 | VN1 - VC2 |
| 0b100 | VN1 - VC3 |
| 0b101 | VN1 - VC4 |
| 0b110 | VN1 - VC5 |
| 0b111 | Reserved |

*FIG. 6C*

METHOD AND APPARATUS FOR FLOW CONTROL INITIALIZATION

FIELD

Embodiments of the invention relate to the field of data communications, and more particularly to packet-based communications regulated through credit-based flow control.

GENERAL BACKGROUND

Most computer systems are formed of components coupled together using one or more buses, which are used to transmit information between the various system components. Present bus standards such as the Peripheral Component Interconnect (PCI) Specification, Rev. 2.1 (published Jun. 1, 1995) provide a multi-drop bus in which multiple devices are coupled to the bus. When coupled to the same bus, it is easy to read or write to devices.

However, in order to achieve higher bus interface speeds, bus architectures are moving away from multi-drop architectures and are beginning to develop point-to-point architectures. In point-to-point bus architectures, peer-to-peer communications are generally more difficult to implement due to difficulties in the synchronization, ordering and coherency of such communications. One example of a point-to-point architecture is a PCI EXPRESS® architecture in accordance with the PCI Express Base Specification, Rev. 1.0 (published Jul. 22, 2002).

Communications between serially connected devices typically involve buffering data to be sent in a transmitting device and then sending the data in a packet form to a receiving device. Various flow control schemes currently exist to control the transfer of data between the devices. One of these control schemes involves conventional credit-based flow control where initialization is accomplished by setting the transmitting device to a maximum credit level based on prior knowledge of the highest credit level supported by that device. Alternatively, in accordance with a phased-crediting HyperTransport™ approach, the transmitting device is set to the maximum credit level based on a multi-field control message transmitted from the receiving device.

In short, the initialization of these conventional credit-based flow control mechanisms consumes significant resources due to excessive overhead and restricts component compatibility based on required knowledge of credit levels between devices in communication with each other.

BRIEF DESCRIPTION OF THE DRAWINGS

The invention may best be understood by referring to the following description and accompanying drawings that are used to illustrate embodiments of the invention.

FIGS. 6A-6C illustrate exemplary embodiments of the credit return codes within the protocol level messages that are used to provide credit-flow control.

DETAILED DESCRIPTION

Figure 1:
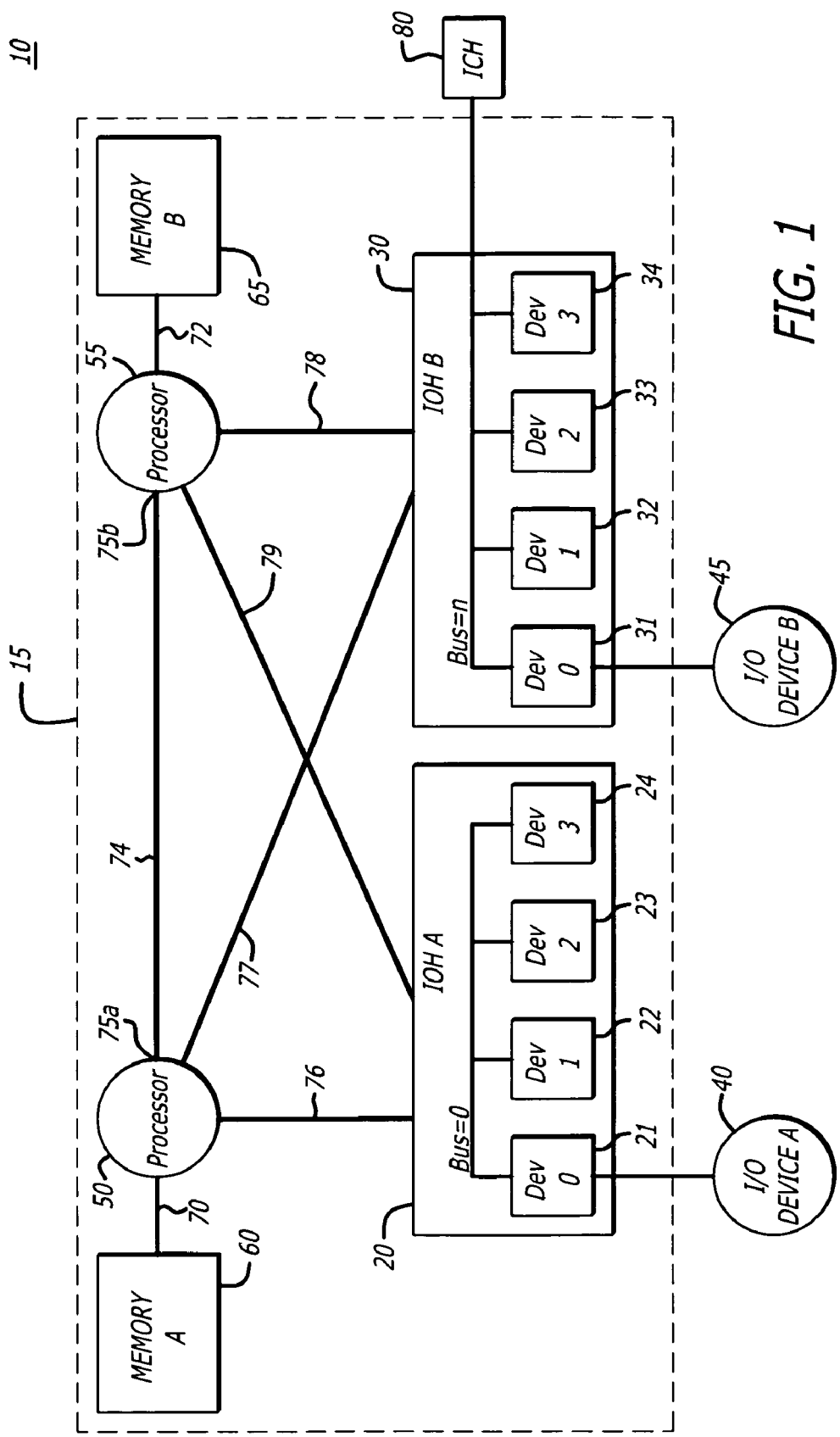
FIG. 1 is a block diagram of a system in accordance with one embodiment of the invention.

Herein, certain embodiments of the invention relate to a system and method for initialization of a credit/debit flow control mechanism without requiring prior knowledge of the storage capacity and capabilities of a transmitting device by a receiving device. In short, there is no requirement for an explicit exchange of a predetermined level of credits to the transmitting device before commencement of point-to-point communications.

According to one embodiment of the invention, the credit/debit flow control mechanism performs credit initialization by a combination of standard protocol level messages (e.g., one or more flits) with encoded credit return values. A "flit" generally refers to a smallest unit of data transfer which, according to one embodiment of the invention, is a plurality of bits in size (e.g., 80-bits long). A "packet" generally refers to a logical grouping of one or more flits.

This credit/debit flow control mechanism further uses saturating counters at the transmitting device with a minimum 1-bit size. Therefore, the initialization operations include a first operation, at time T0, where counters for the transmitting device are set to zero (0) and the counters of the receiving device are set to their maximum credit value. In contrast with conventional credit-based control mechanisms, no predetermined maximum credit size is sent to initialize the transmitting device and no prior knowledge of the resources of the transmitting device is needed. The counters of the transmitting device are incremented during normal operations as the receiving device returns credits to the transmitting device. The receiving device is allowed to send more credits than the transmitting device can track due to the use of saturating counters by the transmitting device.

According to one embodiment of the invention, the maximum credit value (size) is a variable that can be programmed into a device. Such programming may occur at start-up or at various points during the operation of the device under software control. The maximum credit value may be dependent upon the number of storage elements allocated for shared and dedicated storage.

In the following description, certain terminology is used to describe features of the invention. For example, the term "device" is any component coupled to an interconnect. An "interconnect" is generally defined as an information-carrying medium that establishes a communication pathway. The interconnect may be a wired physical medium (e.g., a bus, one or more electrical wires, etc.) or a wireless medium (e.g., air in combination with wireless signaling technology).

A "message" is broadly defined as information placed in a predetermined format for transmission over a bus from a transmitting device to a receiving device. The "transmitting device" is broadly defined as a sender of one or more data packets and recipient of credits while a "receiving device" is broadly defined as the intended recipient of the data packet(s) and the sender of credits.

The term "logic" is generally defined as hardware and/or software that perform one or more operations such as controlling the exchange of messages between devices. When deployed in software, such software may be executable code such as an application, a routine or even one or more instructions. Software may be stored in any type of memory, normally suitable storage medium such as (i) any type of disk including floppy disks, magneto-optical disks and optical disks such as compact disk read-only memories (CD-ROMs), compact disk rewritables (CD-RWs), digital versatile disks (DVDs), (ii) any type of semiconductor devices such as read-only memories (ROMs), random access memories (RAMs), erasable programmable read-only memories (EPROMs), flash memories, electrically erasable programmable read-only memories (EEPROMs), (iii) magnetic or optical cards, or (iv) any other type of media suitable for storing electronic instructions.

In the following description, numerous specific details are set forth. However, it is understood that embodiments of the invention may be practiced without these specific details. In other instances, well-known circuits, structures and techniques have not been shown in detail in order not to obscure the understanding of this description.

Referring to FIG. 1, an exemplary block diagram of a system in accordance with one embodiment of the invention is shown. Herein, system 10 may be a multiprocessor system representing a variety of platforms. For instance, system 10 may be associated with a desktop or mobile computer, a server, a set-top box, any type of wired or wireless communication devices, or the like.

According to this embodiment of the invention, system 10 may include a plurality of processors such as a first processor 50 and a second processor 55 for example. Each processor 50 and 55 may include memory controller functionality such that the processors may directly interface with an associated shared memory via a point-to-point interconnect. For example, as shown in FIG. 1, processor 50 may be coupled to a memory 60 (memory A) via a point-to-point interconnect 70 and processor 55 may be coupled to a memory 65 (memory B) via a point-to-point interconnect 72. Additionally, processors 50 and 55 may be coupled to each other via a point-to-point interconnect 74. Similarly, each of processors 50 and 55 may be coupled via point-to-point interconnects 76-77 and 78-79 to each of a first input/output (I/O) hub (IOH A) 20 and a second IOH 30 (IOH B). While this embodiment of the invention illustrates a platform topology having multiple processors and multiple I/O hubs, it is to be understood that other embodiments may include more or fewer components.

For example, a single processor system may be implemented having a single processor, a single I/O hub and associated I/O devices coupled thereto. Alternately, a multiprocessor system having 4, 8, 16, 32 or another number of processors may be implemented, and an appropriate number of I/O hubs and other elements may be coupled thereto. Any such platform topologies may take advantage of point-to-point interconnections, including multi-core processors with processor cores communicating with each other using the credit/debit flow control mechanism described herein.

Referring still to FIG. 1, area 15 defines a plurality of components that collectively form a subsystem 15 (e.g., coherent subsystem). Subsystem 15 may accommodate coherent transactions without any ordering between channels through which transactions flow. While discussed herein as a coherent subsystem, it is to be understood that both coherent and non-coherent transactions may be passed through and acted upon by components within subsystem 15. For example, a region of one or both of memories 60 and 65 may be reserved for non-coherent transactions.

As further shown in FIG. 1, I/O hubs (IOH) 20 and 30 may each include a plurality of ports (e.g., ports 21-24 in I/O hub "IOH" 20 labeled "Dev 0-3" and ports 31-34 in IOH 30 labeled "Dev 0-3") to interface with I/O devices coupled thereto. For example, in certain embodiments, such I/O devices may be devices in accordance with one or more bus schemes. In one embodiment of the invention, such I/O devices may be PCI Express® devices. For simplicity, FIG. 1 shows a single I/O device coupled to each IOH, namely "I/O device A" 40 coupled via port 21 to IOH 20 and "I/O device B" 45 coupled via port 31 to IOH 30. It is to be understood that the number of ports in an IOH 20 or 30 in accordance with an embodiment of the invention may vary, and the number of ports and devices coupled thereto shown in FIG. 1 are for illustrative purposes only.

Also shown in FIG. 1 is a legacy I/O controller hub (ICH) 80 coupled to IOH 30. In one embodiment, ICH 80 may be used to couple legacy devices such as a keyboard, a mouse, and Universal Serial Bus (USB) devices to coherent system 15.

While the IOHs 20 and 30 shown in FIG. 1 include a plurality of ports, it is to be understood that IOHs 20 and 30 may realize various functions using a combination of hardware, firmware and software. Such hardware, firmware, and software may be used so that each IOH 20 or 30 may act as an interface between subsystem 15 (e.g., shared memories 60 and 65, processors 50 and 55, and IOHs 20 and 30), and/or devices coupled thereto such as I/O devices 40 or 45, respectively. In addition, IOHs 20 and 30 of FIG. 1 may be used to support various interconnect or other communication protocols of devices coupled thereto. IOHs 20 and 30 may act as agents to provide a central connection between two or more communication links.

Point-to-point interconnect 74 between processors 50 and 55 supports a plurality of channels, often referred to herein as "virtual channels" that, along with associated buffers, form one or more virtual networks to communicate data, control and status information between these devices. In one particular embodiment of the invention, each port 75a and 75b may support up to at least six channels identified as channel "VC0" to channel "VC5", although the scope of embodiments of the invention are not so limited.

In some embodiments of the invention, a credit/debit flow control mechanism may be implemented such that each virtual network is associated with a separate credit pool. For instance, a first virtual network "VNA" may be implemented as a shared adaptive buffer virtual network that shares its buffering resources among the virtual channels of the network. In other words, VNA shares storage elements for all of the message classes. The second and third virtual networks ("VN0" and "VN1") are dedicated virtual networks where each virtual channel may have dedicated buffering resources. Of course, it is contemplated that a virtual network may be a combination of at least one shared adaptive buffer network and at least one non-shared buffer network.

Figure 2:
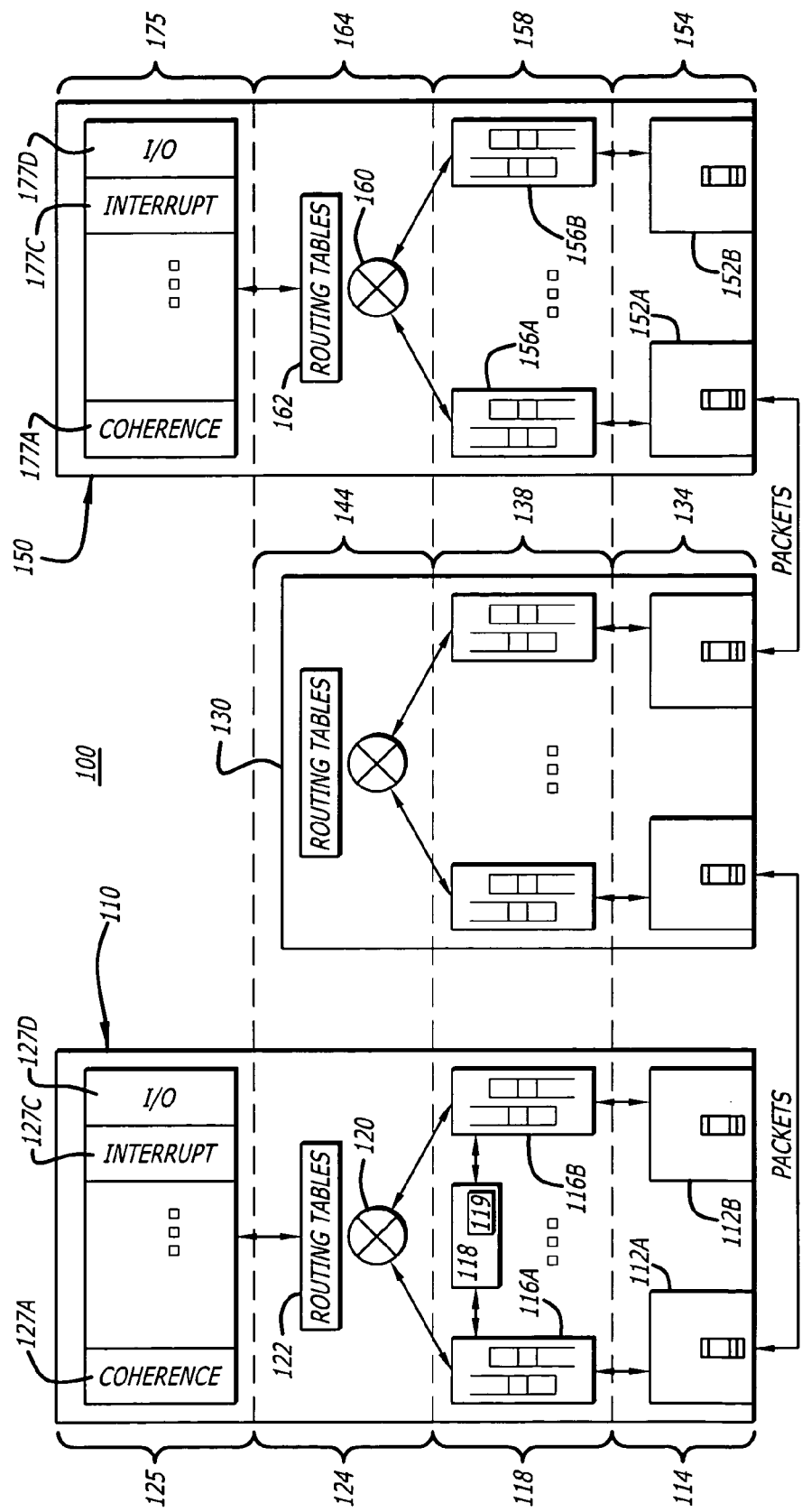
FIG. 2 is a block diagram of a portion of a coherent system in accordance with one embodiment of the invention.

Referring now to FIG. 2, an exemplary block diagram of a portion of coherent subsystem 15 in accordance with one embodiment of the invention is shown. Herein, subsystem 15 includes a transmitting device 110, a receiving device 150, and an optional bridging agent 130. In one embodiment, transmitting/receiving devices 110 and 150 may constitute processors 50 and 55 of FIG. 1. In another embodiment of the invention, transmitting/receiving devices 110 and 150 may constitute I/O hubs 20 and 30, or other bus agents while bridging agent 130 may be a switching device, a repeater or an observability/debug device. Also while discussed in the embodiment of FIG. 2 as a coherent system, it is to be understood that the scope of the invention is not so limited.

Transmitting device 110 may include a plurality of layers, including a physical layer 114, a link layer 118, a routing layer 124 and a protocol layer 125. Packets may be received in transmitting device 110 at physical layer 114, which may include a plurality of electrical transfer ports 112a and 112b. In various embodiments of the invention, physical layer 114 may be used to provide electrical transfer of information between two directly connected coherent devices via an interconnect fabric. While shown as including two such ports in the embodiment of FIG. 2, it is to be understood that additional ports may be present in other embodiments of the invention.

Packets communicated between devices may include a header and associated information (e.g., a "payload"). The packets are then forwarded to link layer 118, which includes include a plurality of buffer flow control mechanisms 116a and 116b, each of which may include an incoming buffer and an outgoing buffer. In addition, link layer 118 further comprises a credit/debit flow control mechanism 117, which includes logic to implement credit-based flow control such as one or more saturating counters 119. At least one saturating counter 119 is associated with each virtual network and/or virtual channel supported by the system.

It is contemplated that device 110 may be adapted to operate as both a transmitting device and a receiving device. In this case, a first set of credit counters would be utilized when the device is functioning as a transmitting device and a second set of credit counters would be used when device 110 is functioning as a receiving device. For clarity sake, however, we shall describe the operations of a device in one mode, either transmit or receive.

Herein, each saturating counter 119 is at least one bit in size and is used to set the credit maximum supported by a transmitting device, namely the number of packets or flits supported by a buffering pool for a particular virtual network or channel. When implemented in a device operating as the receiving device, each saturating counter 119 is used to set the maximum number of credits to be returned by the receiving device.

Figure 5:
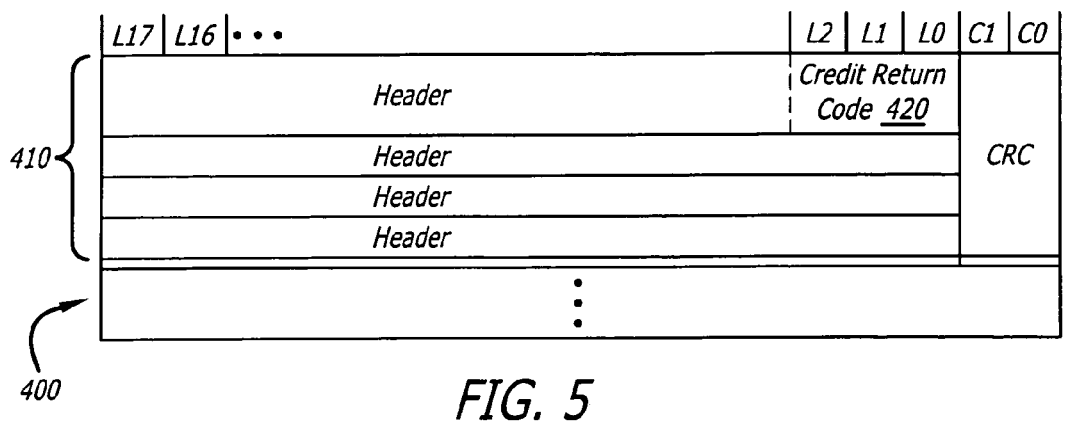
FIG. 5 is an exemplary embodiment of a flit of a protocol level message.

Link layer 118, in various embodiments, may be used to provide reliable data transfer and flow control between two directly connected coherent devices, and also to virtualize a physical channel between these devices. Link layer 118 may be flow controlled to prevent overflow or underflow, and may also provide error detection and recovery. In one embodiment of the invention, flow control may be implemented using a flit-based level credit/debit flow control. In certain embodiments of the invention, however, a packet may be the smallest unit of information that includes routing and other information via a header. Each packet may contain a header and an optional data field. In certain embodiments, the "header" may be one to two flits as shown in FIG. 5, and a data portion may extend to a cacheline size of subsystem 15.

In various embodiments, link layer 118 may virtualize a physical channel into multiple message classes and virtual networks. In such manner, a physical channel may be multiplexed among multiple virtual channels. Such message classes may be used to provide quality of service (QoS) measures.

As will be described further below, in various embodiments a link layer in accordance with an embodiment of the invention may operate with multiple flow controls schemes. For example, a portion of the flow control system may operate on a packet basis, while another portion of the flow control system may operate on a flit basis. However, it is to be understood the scope of various embodiments of the invention should not be so limited and in other embodiments different manners of handling flow control may be implemented.

In one embodiment, link layer 118 may be implemented to handle flow control for a first virtual network operating as a shared adaptive buffer network or one or more non-shared buffer networks. Thus each virtual network of a link layer may have independent buffering and flow control.

In one such embodiment of the invention, three virtual networks may be present, including a first virtual network (e.g., VNA), a second virtual network (e.g., VN0), and a third virtual network (e.g., VN1). The second and third virtual networks may provide for flexible routing and deadlock avoidance via dedicated buffer resources. The first virtual network may provide an adaptive buffer pool so that its buffer resources may be shared among multiple channels for efficient implementation. This adaptive buffer pool may minimize buffer space requirements, in many embodiments. Also, in various implementations, dedicated buffers may be sized to handle a largest packet size for its dedicated channel, while all other buffering resources may be consolidated into the adaptive buffer pool.

In certain embodiments of the invention, the shared virtual network may support a large number of message classes and may be used in connection with one or more non-shared virtual networks to avoid a deadlock situation. For example, a blocked message (e.g., an unavailable credit) of a given message class may be transitioned to a non-shared virtual network and then back to a shared virtual network at a subsequent link (or vice versa). In one embodiment of the invention, non-shared virtual networks may perform flow control on a per message basis, while a shared virtual network may perform flow control on a per flit basis.

When flits are properly received, link layer 118 may provide the flits to routing layer 124. In various embodiments, routing layer 124 may provide a flexible and distributed manner of routing coherent packets from source to destination. The destination-based routing may be determined using routing tables 122 within routing layer 124, which allows for adaptive routing and on-line reconfiguration of the routing tables. In one embodiment of the invention, a header generated by a transaction layer may include information that identifies a receiving device, an input port and a virtual network, and these values may be input into a routing table to determine the desired output port and the virtual network on which the transaction may flow.

In various embodiments of the invention, routing tables 122 may be stored in protected configuration space and programmed by firmware. Such routing tables may be programmed to enable deadlock-free routing for various topologies. Such destination-based routing may be based on a node identifier (node ID), which uniquely identifies an agent within the coherent system. Thus, flits received from link layer 118 may be multiplexed in routing layer 124 through a switch 120 and provided to routing tables 122, which use, for example, a destination node ID field value to route the associated header and payload (if present) to the proper agent. If a packet is destined for transmitting device 110, routing tables 122 will provide the packet to protocol layer 125. Alternately, if the packet is destined for another destination, the header and packet will be sent back through link layer 118 and physical layer 114 of transmitting device 110 to a different device.

In one embodiment of the invention, a protocol layer 125 (also referred to as a "transaction layer") may include various protocol engines to form, order, and process packets for transmission through a coherent system. For example, in one embodiment of the invention, transaction layer 125 may include a coherence engine 127a, an interrupt engine 127C, and an I/O engine 127d, among others. Using such engines, transaction layer 125 may form a packet having a common system header (also referred to as a "system interconnect header"). The packets thus formed in transaction layer 125 may be provided to routing layer 124 on a given virtual channel.

In various embodiments of the invention, protocol layer 125 may use a transaction ID associated with the header to order a transaction and perform desired processing thereon using various engines within protocol layer 125. Shown as representative engines in the embodiment of FIG. 2 are a coherence engine 127a, an interrupt engine 127c, and an I/O engine 127d.

Similar functionality may be present in receiving device 150, which includes a corresponding physical layer 154, link layer 158, routing layer 164, and protocol layer 175. As further shown in FIG. 2, each of these layers may include components similar to those of transmitting device 110, including, for example, electrical transfer units 152a and 152b, buffer flow control mechanisms 156a and 156b, switch 160, routing tables 162, and protocol engines 177a, 177c, and 177d.

Further shown in FIG. 2, when implemented, a bridging agent 130 may include corresponding physical, link, and routing layers (respectively, physical layer 134, link layer 138, and routing layer 144). In certain embodiments of the invention, bridging agent 130 may be a switch, bridge, hub, or the like, and may be used to provide a bridge between a different set of agents or nodes of coherent system 100. For example, in another embodiment, bridging agent 130 may be coupled to a first plurality of processors (e.g., on a left hand side) and a second plurality of processors (e.g., on a right hand side). It is contemplated, however, that transmitting device 110 and receiving device 150 may be in direct communication without bridging agent 130.

Figure 3:
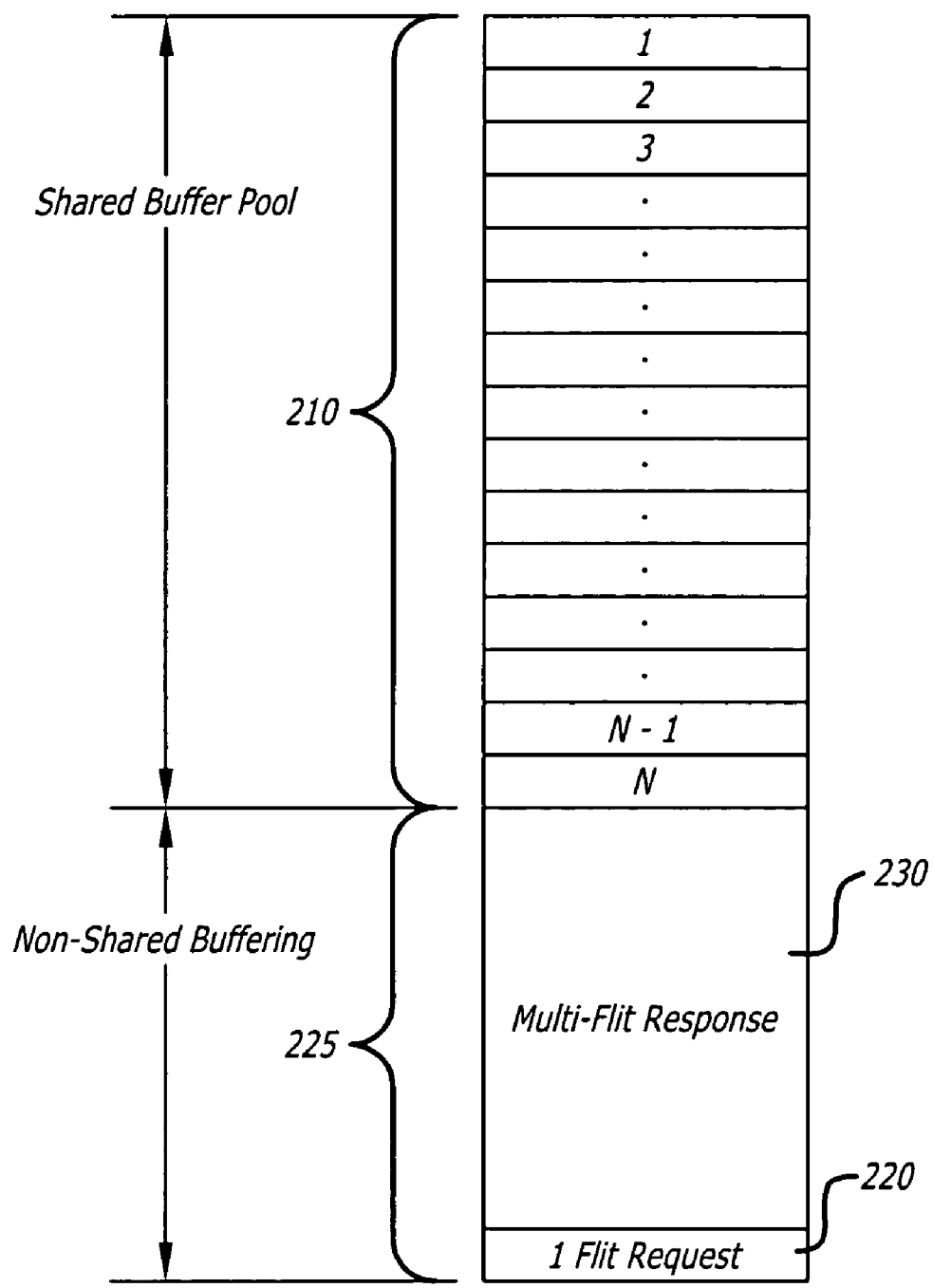
FIG. 3 is a block diagram of a buffer scheme in accordance with one embodiment of the invention.

Referring now to FIG. 3, a block diagram of a buffer scheme is shown. As shown in FIG. 3, a buffer configuration 200 of a link layer may include shared buffers and non-shared buffers. Specifically, buffer configuration 200 includes a shared buffer pool 210 that includes a plurality of flit-sized blocks (e.g., 1 to N blocks in the embodiment of FIG. 3). Buffer configuration 200 further includes a non-shared buffer pool 225, each buffer of which may be dedicated to a given virtual channel. For ease of illustration, only two such non-shared buffers are shown in the embodiment of FIG. 3. Thus, a multi-flit response buffer 230 and a single flit-sized request buffer 220 are shown corresponding to these two virtual channels. In various embodiments of the invention, each virtual network may include two or more virtual channels to handle different message sizes. For example, one virtual channel may carry requests with a size of one flit, while another virtual channel of the same network may carry data responses sized for multiple flits.

In one implementation, buffer 220 may be dedicated to a request virtual channel, such as a data request channel, while response buffer 230 may be dedicated to a response channel, such as a data response channel, although the scope of the embodiments of the claimed invention are not so limited. In various embodiments of the invention, a dedicated buffer may be provided for each virtual channel of a virtual network implementing dedicated buffers. Accordingly, non-shared buffer pool 225 of buffer configuration 200 may be associated with a first virtual network, while shared buffer pool 210 may be associated with a second virtual network.

In various implementations, a credit/debit flow control mechanism may be implemented in which a transmitting device is provided a predetermined number of credits with which to send messages. Such credits may be separated by virtual network, and in the case of a non-shared virtual network, may also be separated by virtual channel. That is, each virtual channel of a non-shared virtual network may have dedicated credits. In various embodiments of the invention, credit/debit flow control for the non-shared virtual network may operate on a packet basis. For example, a request message may be sent using a single request credit, while a single response credit may be used to send a response message, regardless of message size. In contrast, in a shared adaptive virtual network, credit/debit flow control may operate on a flit basis. In such an implementation, a single shared adaptive credit may be used to send a single flit request message, while five shared adaptive credits (for example) may be used to send a five-flit response message. Similarly, credit return may be implemented on a packet basis for the non-shared virtual network, with each virtual channel having dedicated credit returns. In contrast, for a shared adaptive virtual network, credits may be returned on a flit or multi-flit basis and used by all virtual channels within that network. By using both packet and flit credits, the number of credit return messages for a non-shared virtual network may be reduced. Furthermore, one or more shared virtual networks may support a variety of different packet sizes by operating on a flit basis in the credit/debit flow control system.

Figure 4:
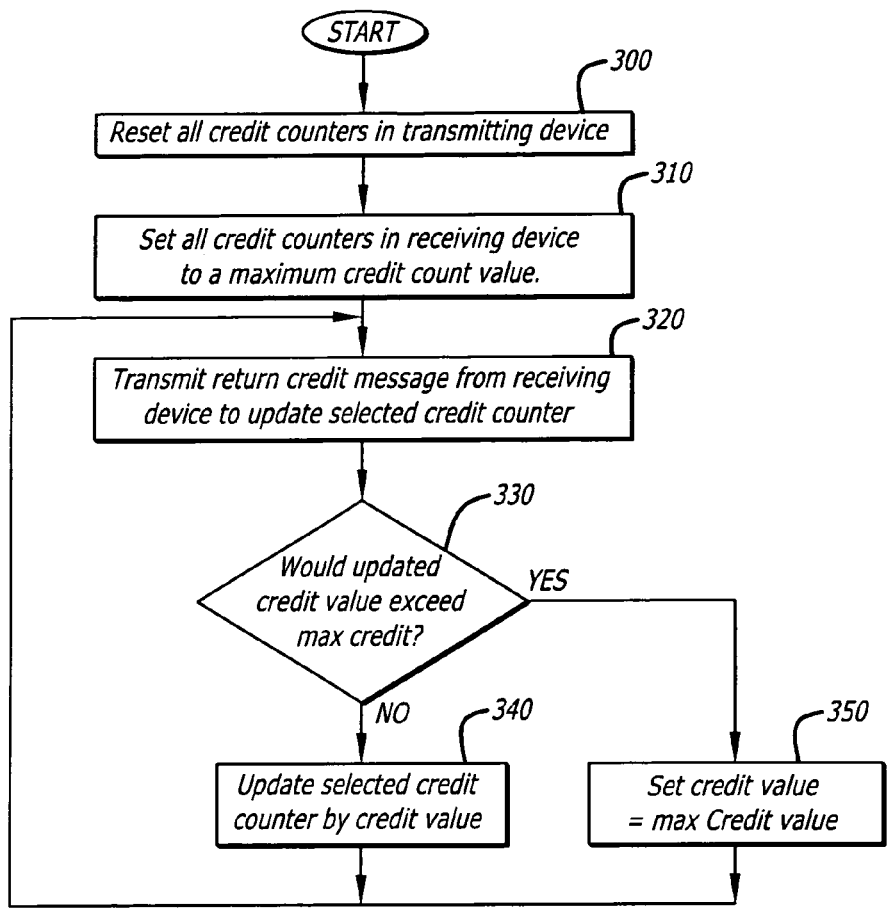
FIG. 4 is a flow diagram of a method in accordance with one embodiment of the invention.

Referring now to FIG. 4, an exemplary embodiment of a flow diagram of flow control initialization is shown. Initially, the credit counters in the transmitting device are reset and all credit counters in the receiving device are set to a maximum credit count value (blocks 300 and 310). Thereafter, a message is transmitted from the receiving device to the transmitting device in order to update a selected credit counter of the transmitting device (block 320). The message includes a credit return value (code) as illustrated in FIGS. 5 and 6A-6C.

FIG. 5 illustrates an exemplary embodiment of a flit 410 of a protocol level message 400. Flit 410 operates as the header and includes a credit return code 420. For this embodiment of the invention, credit return code 420 is a 3-bit Huffman encoded value that is placed within header 410. While credit return code 420 is illustrated as being implemented toward the least significant bits of header 410, it is contemplated that other embodiments of the invention may place credit return code 420 at a different location other than illustrated.

FIGS. 6A-6C are exemplary embodiments of the credit return codes that are used to provide credit-flow control. Herein, as shown in FIG. 6A, when certain significant bit(s) of credit return code 420 is(are) assigned a selected bit value (e.g., most significant bit is logic "0"), this identifies the application of a credit to the shared adaptive buffer virtual network (VNA). Since most of the buffering resources will be in VNA, the number of credit applied to the buffering resources for VNA are decoded from credit return code. For instance, the credit return code "0b001" denotes that a first predetermined number of credits (e.g., 2 credits) are applied to the buffer pool associated with shared adaptive buffer virtual network (VNA). Similarly, codes "0b010" and "0b011" denote that a second and third predetermined number of credits (e.g., 8 and 16 credits) are applied to buffering resources associated with VNA. Credit return code "0b000" denotes a "Null" message (or No operation "NOP") where no credits are applied.

As shown in FIG. 6B, when certain significant bit(s) of credit return code 420 is(are) assigned a selected bit value (e.g., most significant bit is logic "1"), this identifies that credit is to be applied to buffering resources associated with a particular virtual channel of a virtual network such as second and third virtual networks ("VN0" and "VN1"). For this embodiment of the invention, the credit return code "0b100" denotes the second virtual network (VN0) and "0b101" denotes the third virtual network (VN1).

Thereafter, if the credit return code is directed to VN0 or VN1, the decoding is performed based on the credit return code on the next cycle. In the subsequent message, the credit return code is used to determine which particular virtual channel (and thus which buffer pool for that virtual channel) that a single credit is applied. Such determination may be obtained from tables A and B set forth in FIG. 6C.

Referring back to FIG. 4, upon identifying the credit counter, a determination is made whether the number of credits (credit value) of the credit return message causes the credit counter to exceed its maximum credit threshold (block 330). If not, the credit counter is updated by the credit value (block 340). Otherwise, the credit counter is set to the maximum credit threshold supported by the credit counter (block 350).

The credit/debit flow control mechanism continues where additional return credits are embedded in protocol level messages, such as read or write messages, in order to control the flow of messages from the transmitting device to the receiving device.

Figure 7:
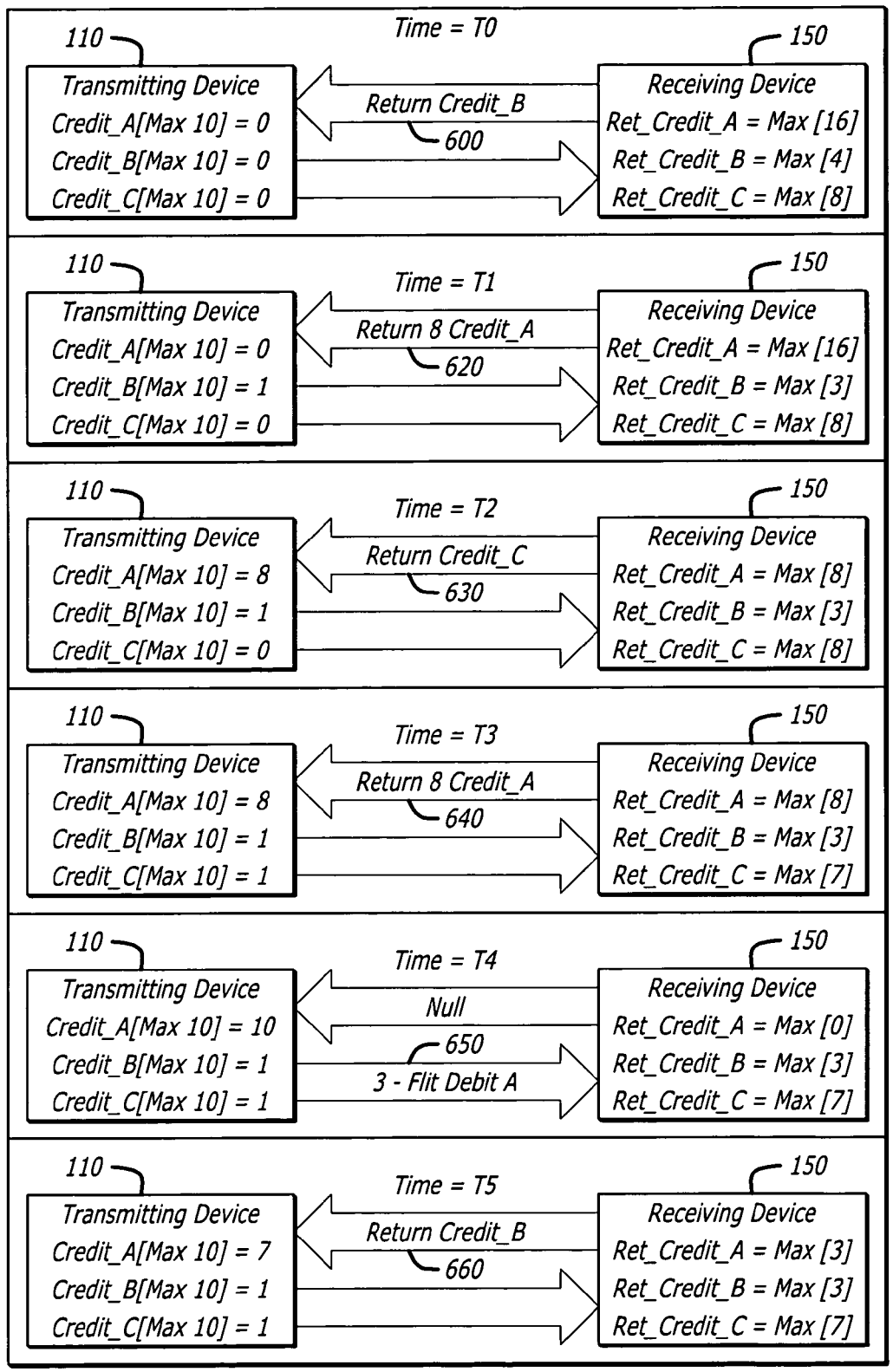
FIG. 7 is an exemplary timing diagram of message transactions occurring in accordance with an embodiment of the invention.

Referring now to FIG. 7, an exemplary embodiment of an illustrative sequence of messages between a transmitting device and a receiving device during flow control initialization is shown. Herein, a virtual network for shared adaptive buffering (VNA) is associated with shared buffering resource A while virtual networks VN0 and VN1 are associated with dedicated buffering resources B & C.

At time T0, the buffering resources of the receiving device are allocated so that there are 16 buffers in a first buffering resource A, 4 buffers in a second buffering resource B and 8 buffers in a third buffering resource C. The credit return values in counters associated with these buffering resources are set to their maximum values while the credit counters of the transmitting device are cleared. For illustration sake, transmitting device 110 includes counters with maximum count thresholds of 10.

At T0, an IDLE flit 600 is sent from receiving device 150 to transmitting device 110. "IDLE flit" message 600 returns credits, but does not take any buffer slots. Herein, a single credit is applied to a second credit counter 612 associated with buffering resources B.

At time T1, a protocol level message 620 (e.g., READ, WRITE, etc.) is transmitted from receiving device 150 to transmitting device 110. Protocol level message 620 includes a credit return code that identifies 8 credits being applied to a first credit counter 610 associated with buffering resources A.

At time T2, a protocol level message 630 is transmitted from receiving device 150 to transmitting device 110 in which a single credits are applied to a third credit counter 614 associated with buffering resources C.

At time T3, a protocol level message 640 is transmitted from receiving device 150 to transmitting device 110. Protocol level message 640 includes a credit return code that identifies 8 credits being applied to first credit counter 610. However, since first credit counter 10 is a saturating counter and a maximum credit threshold is 10, the counter is set to this value.

At time T4, the transmission of a protocol level message 650 from transmitting device 110 to receiving device 150 causes first credit counter 610 to be decremented for each flit of message 650. For a 3-flit message, first credit counter 610 is decremented and would have a value "7" which is below its maximum credit value. Thus, the counter may be incremented by receiving additional credits.

Figure 8A:
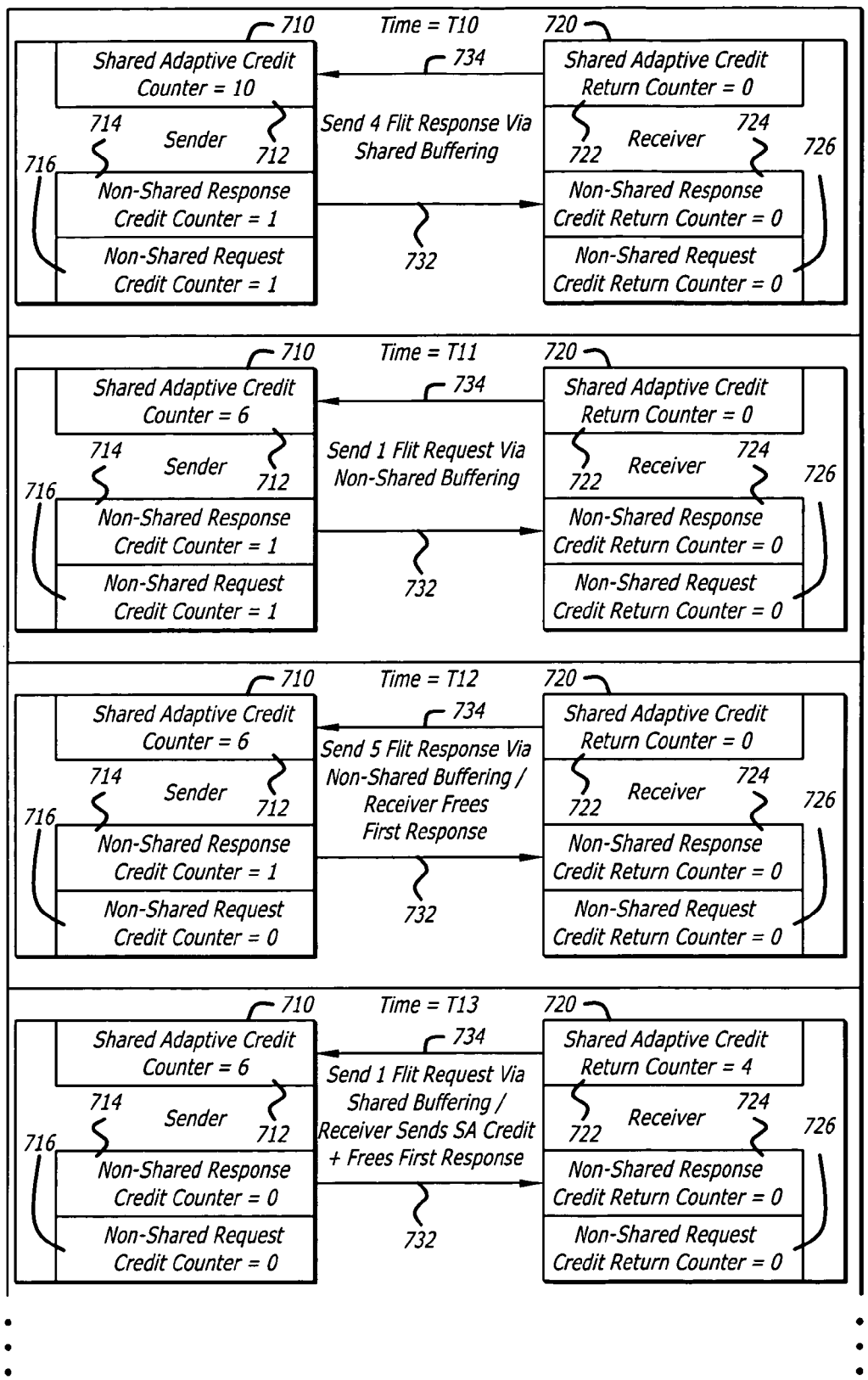
FIGS. 8A and 8B collectively are a detailed timing diagram of message transactions following initial messaging for initialization of the devices in communication.
Figure 8B:
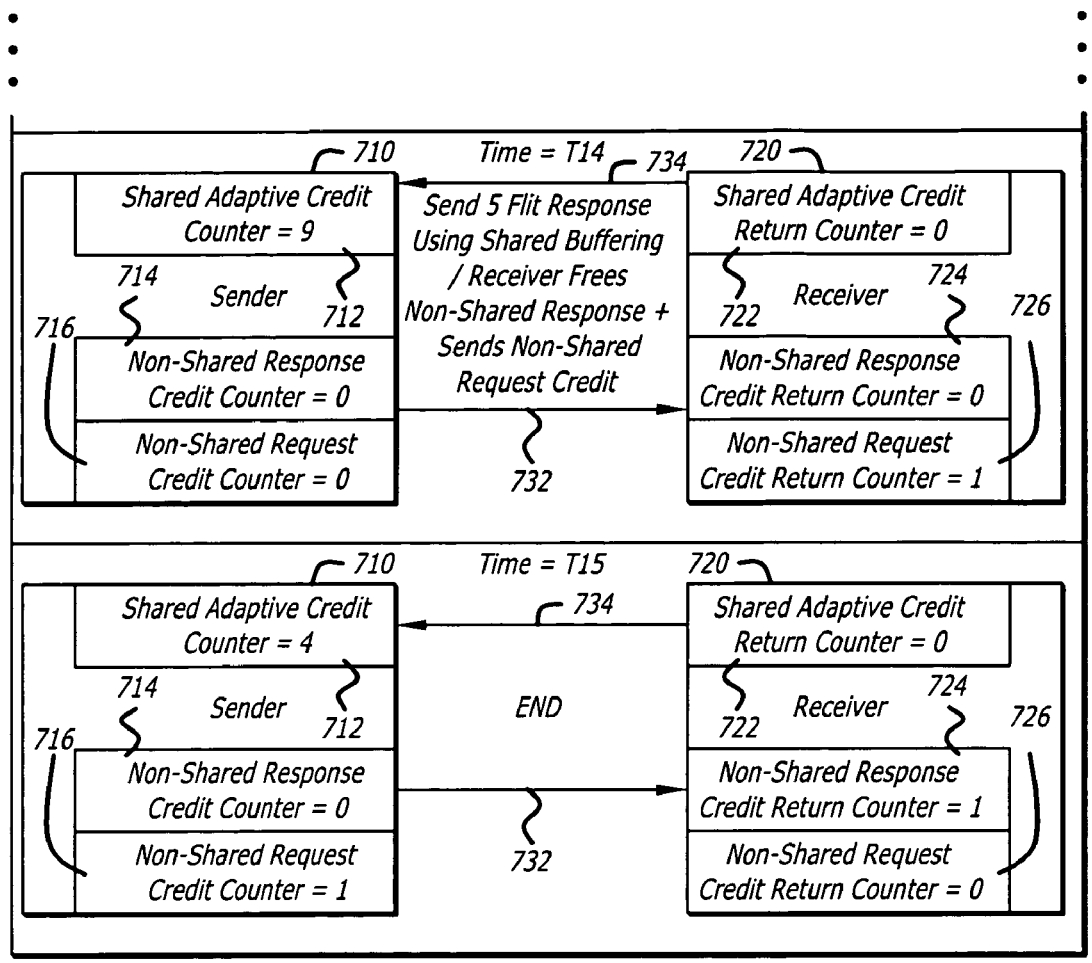

Referring now to FIGS. 8A and 8B, a timing diagram of message transactions. As shown in FIGS. 8A-8B, a transmitting device (i.e., a sender) 710 is connected via point-to-point interconnects 732 and 734 to a receiving device (i.e., receiver) 720. As shown in FIGS. 8A-8B, sender 710 includes multiple counters for use in flow control. Specifically, sender 710 includes a shared adaptive credit counter 712, a non-shared response credit counter 714, and a non-shared request credit counter 716. Similarly, receiver 720 includes a shared adaptive credit return counter 722, a non-shared response credit return counter 724, and a non-shared request credit return counter 726. While shown with these particular counters in the embodiment of FIGS. 8A and 8B, it is to be understood that the scope of the present invention is not so limited, and in other embodiments different counter structures may be present.

For example, the counters of sender 710 may also be present in receiver 720, and the counters of receiver 720 may also be present in sender 710. Furthermore, while not shown in FIGS. 8A-8B, it is to be understood that sender 710 and receiver 720 each includes multiple buffers, including dedicated buffers and shared buffers, such as those shown in FIG. 3 discussed above.

FIGS. 8A and 8B collectively show a view of the different counters modified by operations occurring during a time sequence of hypothetical transactions. As shown at a time T10, the counters of sender 710 have a status in which shared adaptive credit counter 712 equals ten, and non-shared response credit counter 714 and non-shared request credit counter 716 both equal one. At receiver 720, shared adaptive credit return counter 722 equals zero, as do non-shared response credit return counter 724 and non-shared request credit return counter 726.

At time T10, sender 710 sends a four-flit response using the shared buffer. Accordingly, as shown at a following time T11 (it is to be understood that the time periods shown at FIG. 8A are meant to show chronological order, and not necessarily bus cycles or other specific timing pattern), shared adaptive credit counter 712 of sender 710 has accordingly been decremented to a value of six to reflect the prior four-flit response that was sent. All other counters remain at their same values at time T11. Also at time T11, sender 710 sends a one-flit request using a non-shared buffer.

At a next time T12, sender 710 sends a five-flit response using a non-shared buffer. Furthermore, at time T12, receiver 720 frees the first response that was sent (e.g., the four-flit response sent at time T10). Also at time T12, non-shared request credit counter 716 of sender 710 has been decremented to zero to reflect the request sent at time T11. All other counters remain at their previous value.

At a next time instant (T13), non-shared response credit counter 714 of sender 710 has been decremented to zero, reflecting the response sent at time T12. Furthermore, shared adaptive credit return counter 722 of receiver 720 has been updated by a value of four to reflect the freeing of the four-flit response (that occurred at time T12) sent by sender 710 at time T10. Sender 710 sends a one-flit request using shared buffering at time T13. Furthermore, receiver 720 sends the shared adaptive credit message and frees the first request (i.e., the one-flit request sent at time T11) at time T13.

Assume instead at time T13, shared adaptive credit counter 712 has a value of zero and that sender 710 still desires to send a one-flit request. In this scenario, the packet is forced to be transmitted via non-shared buffering. However, note that at time T13, non-shared request credit counter 716 also has a value of zero. Assuming this scenario occurs, sender 710 may send a signal back to a protocol layer, for example, to indicate the lack of resources.

Referring back now to the actual scenario shown in FIG. 8B, as shown at a time T14, shared adaptive credit counter 712 has been updated to a value of nine to reflect the shared adaptive credit return of four and the one flit request sent at time T13. Also shown at time T14, shared adaptive credit return counter 722 has been decremented to zero, and non-shared request credit return counter 726 of receiver 720 has been updated to a value of one to reflect the freeing of the non-shared request that occurred at time T13. Also at time T14, sender 710 sends a five-flit response using shared buffering. Furthermore, receiver 720 frees the non-shared response that occurred at time T12 and also receiver 720 sends the non-shared request credit.

Accordingly, as shown at time T15, shared adaptive credit counter 712 has been updated to a value of four and non-shared request credit counter 716 has been updated to a value of one (and correspondingly non-shared request credit return counter 726 of receiver 720 has been updated to a value of zero). Further, non-shared response credit return counter 724 has been updated to a value of one.

While shown with this example sequence in FIGS. 8A and 8B, it is to be understood that additional counters and operations may be performed at various times and between different devices using embodiments of the present invention. The application of return credits by counters at the sender further illustrate the initialization sequences that can be performed in accordance with the claimed invention.

While the invention has been described in terms of several embodiments of the invention, those of ordinary skill in the art will recognize that the invention is not limited to the embodiments of the invention described, but can be practiced with modification and alteration within the spirit and scope of the appended claims. The description is thus to be regarded as illustrative instead of limiting. For instance, the ACK message may be from another Network Layer other than TCP as described above.

What is claimed is:

1. A method comprising:
  setting credit levels of a transmitting device of a credit and debit flow control system to zero, the credit levels adapted to control an output of messages from the transmitting device;
  initializing the system by returning credits through a series of standard protocol level messages each including a credit return value in lieu of setting the transmitting device to a predetermined maximum credit value at initialization, the credits are separated by virtual network; and
  extracting the credit return value from a standard protocol level message and, where the credit return value does not denote a Null message, incrementing a counter in the transmitting device by a credit level specified by the credit return value provided that the credit level does not cause the counter to exceed a maximum credit level supported by the counter.

2. The method of claim 1, further comprising:
  setting credit levels of a receiving device to a maximum credit value prior to initializing the system.

3. The method of claim 1, wherein the standard protocol level messages are provided over a plurality of virtual channels, the credits being separated by virtual channels for a non-shared virtual network.

4. The method of claim 3, wherein the incrementing of the counter includes incrementing a saturating counter adapted to maintain a credit level of a buffer to be shared by the plurality of virtual channels.

5. The method of claim 3, wherein the incrementing of the counter includes incrementing a saturating counter adapted to maintain a credit level of a buffer dedicated to a virtual channel of the plurality of virtual channels.

6. The method of claim 5, wherein the incrementing of the saturating counter is restricted to one credit per message.

7. The method of claim 1, wherein the setting of the credit levels of the transmitting device comprises setting a plurality of saturating counters each having a maximum credit level greater than zero and each associated with one or more buffers, one of the plurality of saturating counters being the counter.

8. The method of claim 1, wherein the credit return value used for initializing the system is encoded.

9. A device comprising:
  a saturating counter to maintain a credit level adapted to control a flow of information from the device, the saturating counter being adapted to maintain the credit level for a buffer that is either (i) shared by a plurality of virtual channels or (ii) dedicated to a virtual channel of the plurality of virtual channels;
  logic to set the saturating counter to zero and to initialize the device by adjusting the credit level of the saturating counter based on a credit return value stored within a header of a standard protocol level message provided from a second device in communication with the device, the logic to further extract the credit return value from the standard protocol level message, decode the credit return value being an encoded value, and, where the credit return value does not denote a Null message, increment the saturating counter by a credit level specified by the credit return value provided that the credit level does not cause the saturating counter to exceed a maximum credit level supported by the saturating counter.

10. The device of claim 9, wherein the standard protocol level message is provided by the second device in communication with the device over the plurality of virtual channels.

11. The device of claim 9, wherein the saturating counter is incremented one credit per message.

12. A system comprising:
  a first processor including a counter that is adapted to maintain a credit level for controlling an output of messages from the first processor, the counter initially being set to zero;
  a second processor to initialize the system by returning credits through a series of standard protocol level messages to the first processor, each of the protocol level messages including a credit return value that represents the credit level for either (i) a virtual network or (ii) a virtual channel of a non-shared virtual network,
  wherein the first processor and the second processor are processor cores placed in a single semiconductor package to form a multi-processor component, and
  wherein the first processor to extract the credit return value from the standard protocol level message and, where the credit return value does not denote a Null message, incrementing the counter by a credit level specified by the credit return value provided that the credit level does not cause the counter to exceed a maximum credit level supported by the counter.

13. The system of claim 12, wherein the second processor returning the protocol level messages being one of a READ or WRITE messages.

14. The system of claim 12, wherein the second processor including a counter set to a maximum credit value prior to returning the protocol level messages.

* * * * *